United States Patent [19]

Tank et al.

[11] Patent Number: 5,331,399
[45] Date of Patent: Jul. 19, 1994

[54] METHOD FOR MEASURING AND DETERMINING A ROTATION ANGLE OF A ROTATING OBJECT

[75] Inventors: Volker Tank, Eching; Helmut Dietl, München; Peter Haschberger, Gauting; Erwin Lindermeir, Augsburg; Oliver Mayer, Neubiberg; Rainer Thiessen, München, all of Fed. Rep. of Germany

[73] Assignee: Deutsche Forschungsanstalt fur Luft- und Raumfahrt, Cologne, Fed. Rep. of Germany

[21] Appl. No.: 874,168

[22] Filed: Apr. 27, 1992

[30] Foreign Application Priority Data

Apr. 27, 1991 [DE] Fed. Rep. of Germany ....... 4113841

[51] Int. Cl.⁵ .............................................. G01B 9/02
[52] U.S. Cl. .................................. 356/346; 356/345; 356/356; 250/231.13
[58] Field of Search ................... 356/345, 346, 356; 250/231.13

[56] References Cited

U.S. PATENT DOCUMENTS

| | | | |
|---|---|---|---|
| 4,894,533 | 1/1990 | Abe et al. | 250/231.13 X |
| 4,899,048 | 2/1990 | Shelander | 250/231.13 X |
| 4,908,510 | 3/1990 | Huggins et al. | 250/231.13 |
| 4,931,635 | 6/1990 | Toyama | 250/225 |
| 4,973,838 | 11/1990 | Bell et al. | 250/234 |
| 5,148,235 | 9/1992 | Tank et al. | 356/346 |
| 5,155,550 | 10/1992 | Barger | 356/345 |
| 5,164,791 | 11/1992 | Kubo et al. | 356/356 |
| 5,189,491 | 2/1993 | Sogabe et al. | 356/372 |
| 5,200,797 | 4/1993 | Tank et al. | 356/345 |

FOREIGN PATENT DOCUMENTS 0241118  11/1986  Fed. Rep. of Germany .
2060940  5/1981  United Kingdom .

OTHER PUBLICATIONS

*IBM Technical Disclosure Bulletin*, vol. 25, No. 11B, Apr. 1983, S. 6052.

Primary Examiner—James C. Housel
Assistant Examiner—Harold Y. Pyon
Attorney, Agent, or Firm—Browdy and Neimark

[57] ABSTRACT

A method for measuring and determining a rotation angle of a rotating object in which a clock track corresponding to a desired angular resolution is applied on a magnetic, optical or optomagnetic storage medium. The storage medium is then rotated synchronously with the rotating object, and during the operation a pulse sequence corresponding to the clock track is read from said storage medium. The read pulse sequence is then supplied for further processing to following electronics in which the actual rotation angle is firstly stored in a FIFO memory and secondly directly available for further uses. Furthermore, the invention provides an apparatus for measuring and determining a path difference in Michelson interferometers in which path difference are generated via a rotary movement, for example of a rotating retroreflector. A memory medium is rigidly connected to the rotation shaft of the rotating retroreflector generating a path difference and on said medium a clock track corresponding to the sampling theorem is applied and during the rotation movement is read by a read head fixedly associated with the storage medium. During operation said pulse sequence is read by the read head and supplied to following signal electronics in which from the pulse sequence the desired clock pulse and thus the path information is then obtained.

9 Claims, 2 Drawing Sheets

METHOD FOR MEASURING AND DETERMINING A ROTATION ANGLE OF A ROTATING OBJECT

BACKGROUND OF THE INVENTION

1. Field of the Invention

The invention relates to a method for measuring and determining a rotation angle of a rotating object in which on a magnetic, optical or optomagnetic storage medium a clock track corresponding to the desired angular resolution is applied, the storage medium is rotated synchronously with the rotating object, in operation a pulse sequence corresponding to the clock track is supplied for further processing to following signal electronics in which the actual rotation angle or the actual angular velocity of the rotating object is available.

2. The Prior Art

As sensors for rotary movements and in conjunction with mechanical measuring means, such as measuring racks or threaded spindles, for linear movements rotation pickups and angle measuring devices are used. Such devices are employed in automation in general mechanical engineering, in robots and handling apparatuses, adjustment and displacement means as well as devices for information technology, antennas, direction devices and also testing and measuring devices of all kinds.

In incremental measurement the output signals of incremental rotation pickups and angle measuring devices are supplied to counting electronics in which the measured value is determined by counting individual "increments". In an incremental rotation pickup the shaft is mounted in a flange with ball bearings set free of play and carries a grating disc of glass on which a radial grating ruling is applied. The opaque lines, which are about twice as wide as the transparent gaps therebetween, consist of chromium which has been evaporated in vacuum to the glass body by the DIADUR method. At a slight distance from the ruling, on the flange a scanning plate is arranged which on small fields carries in each case the same grating ruling or division as the grating disc. However, on the four fields of the scanning plate the lines are arranged respectively, offset by a quarter of a division period. In addition, on the grating disc, as on the scanning disc, a field is applied having a reference mark which with coarser divisions is formed by a single line and with fine divisions by a line group.

All these fields are permeated by a parallel light beam which is generated by a light source and a lens. The light flux is modulated on rotation of the grating disc and impinges on photocells which generate two electrical approximately sinusoidal signals and a reference mark signal. The two sinusoidal signals are electrically 90° out of phase with respect to each other; a signal period of 360° corresponds to a rotation angle through one division period of the radial grating ruling.

With incremental rotation pickups made up in this manner the production is complicated and in addition high angular resolutions and non-linear angle encoding are very difficult to implement; for this reason incremental rotation pickups made in this manner are expensive.

In Michelson interferometers in which rotating retroreflectors are used to generate the path differences, the distance measurement is carried out by means of a laser radiation. The laser radiation passes through the interferometer and from the resultant interference signal, since the wavelength of the laser radiation is known, the path difference can be calculated. A disadvantage in this type of distance or path measurement is that either a reference interferometer for the laser radiation must be coupled to the signal interferometer or the laser radiation must be conducted through the signal interferometer. In the second case a separate region of the beam splitter must be suitable for the laser radiation. As a result, either the region of the signal radiation is restricted or beam splitters, mirrors, lenses and the like larger components must be employed. Furthermore, it is complicated to make a beam splitter which has different optical properties in two geometrically separate regions because the signal radiation usually lies in the infrared whilst the laser is usually an HeNe laser with a wavelength of 632.8 nm. It is further disadvantageous that economical laser tubes as a rule have a low life whilst long-life tubes are expensive.

SUMMARY OF THE INVENTION

Thus, it is an object of the invention to provide a method for measuring and determining a rotation angle of a rotating element and thus a path measurement in Michelson interferometers in which the path differences are generated via a rotation movement, and desired relationship between the rotation angle and the rotation movement being storable so that a high reliability can be achieved with small expenditure.

This object is accomplished in accordance with the invention, by a method for measuring and determining a rotation angle of a rotating object, wherein for a relative angle measurement a pulse sequence is stored on a circular disc-like storage medium, and to obtain the best possible angular resolution a track stored on the extreme outside of the periphery of the circular disc-like storage medium with maximum write density is used and for lower angular resolutions tracks arranged further inwardly and/or having lower write densities are employed. In an absolute angle measurement one or more pulse sequences are stored on the circular disc-like storage medium coded in one or more tracks.

Furthermore, the method according to the invention can be employed in advantageous manner in particular in Michelson optical interferometers with rotating retroreflectors as are described for example in DE 34 41 040. In such interferometers, in which by one or more rotating mirror elements in the form of the rotating retroreflectors mentioned above a path change is generated, rotation angles are measured by means of storage media rigidly coupled to the rotating mirror elements and read heads fixedly associated with said media. The path change in the interferometer is then determined from the rotation angles measured in associated electronics.

According to a further advantageous modification of the invention, to generate a clock sequence on the storage medium an interferometer can be temporarily equipped with a reference path measuring system. A pulse sequence is generated by an interference measurement, which corresponds to the path change measured and is then recorded on the clock track of the storage medium.

Furthermore, according to the invention it is provided an apparatus for measuring and determining a rotation angle of a rotating object in which a magnetic, optical or optomagnetic storage medium is provided in the form of a circular disc which is configured for example as magnetic disc memory in the form of a floppy disc or a floptical disc, an optical memory in the form of a compact disc or as a WORM (Write Once Read Multiple) memory. According to the invention one of these storage media is rigidly and coaxially coupled to the shaft of the rotating object, for example a rotating retroreflector.

Furthermore, with respect to the shaft axis a read head is associated with the circular disc-like medium and with said head a track formed on the storage medium used in concentric circles is associated. A pulse sequence corresponding to the clock track and a required angular resolution is then processed in signal electronics following the read head in such a manner that the actual rotation angle or the actual angular velocity of the rotating object, for example a rotating retroreflector, is available. A laser may for example be employed for a storing of a pulse sequence, necessary only once according to the invention.

According to the invention the laser is thus replaced in an interferometer used in operation by a recording of a generated signal and said recording can be read again and again. To generate said recording, for example, a replaceable storage medium may be installed in a recording interferometer and held in a defined position with respect to its angular position by means of locating and centering means. Such a storage medium removed from the recording interferometer and provided with a pulse sequence can subsequently be accommodated fixedly in an operating interferometer.

It would also be conceivable for each individual interferometer to be equipped in the course of production with a laser and a beam splitter and detector suitable only for said laser, and then after the recording of the pulse sequence said components can be removed from the interferometer again.

BRIEF DESCRIPTION OF THE DRAWINGS

The invention will be explained in detail below by means of preferred embodiments making reference to the attached drawings.

DETAILED DESCRIPTION OF THE DRAWINGS

Figure 1:
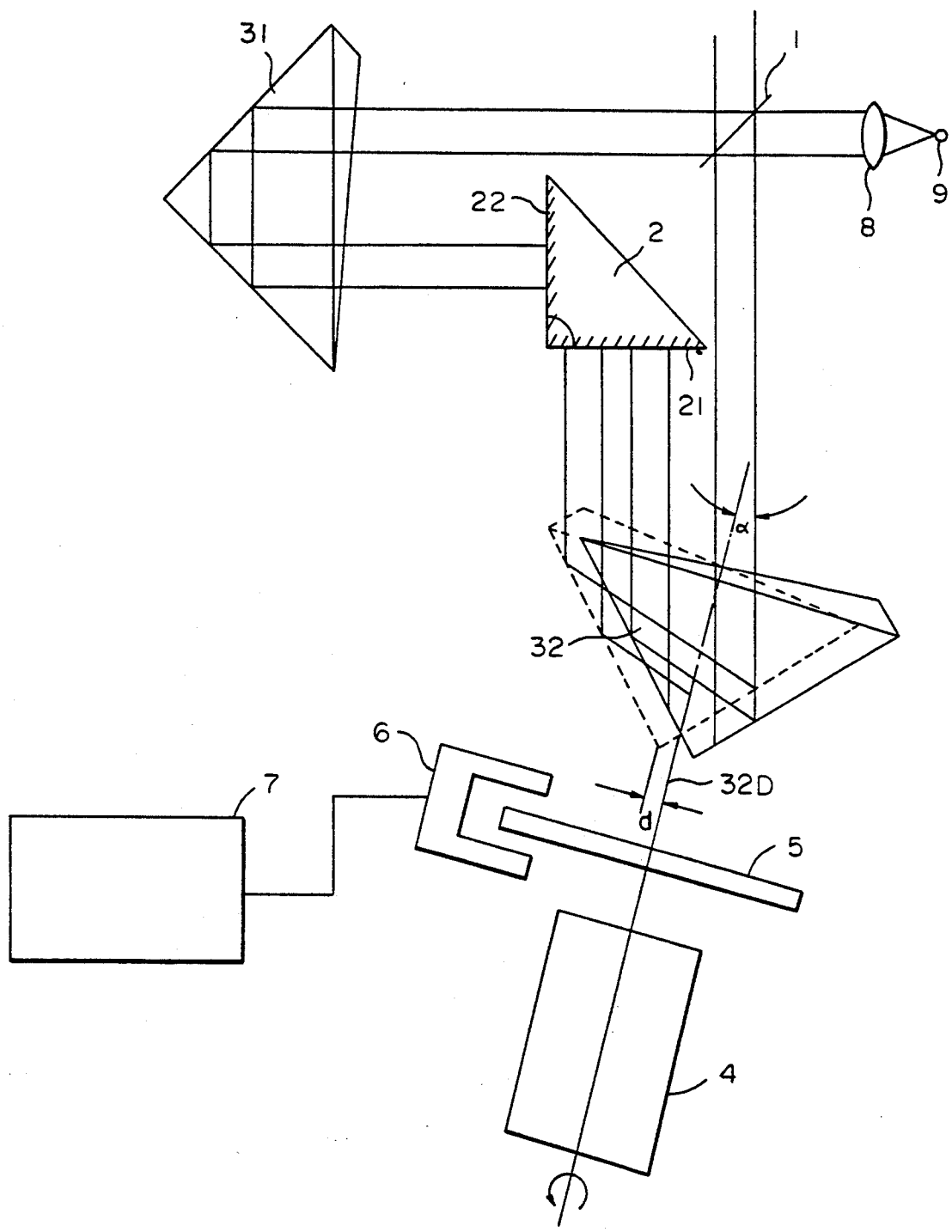
- FIG. 1 shows an embodiment of an interferometer equipped according to the invention and having a rotating retroreflector.

In FIG. 1 an interferometer comprises a beam splitter 1 which is arranged at 45° to two mirrors 21 and 22 normal to each other and together formed by a rectangular mirror 2. Also provided in the interferometer are a stationarily arranged retroreflector 31, a rotatable retroreflector 32 having a pivot shaft 32D, a motor 4 rigidly connected to the pivot shaft 32D, a storage medium 5 rigidly connected to the pivot shaft 32D and in the form of a circular WORM (Write Once Read Multiple) memory, an optical memory or a magnetic disc, a read head 6 fixedly associated with the storage medium and signal electronics 7 following the read head 6, as well as a convergent lens 8 and a detector 9. During operation the retroreflector 32, the storage medium 5 and the rotor of the electric motor 4 rotate synchronously. For example, during the fabrication of an stored synchronously to the rotation which is obtained from the interferogram of a laser radiated into the (or a corresponding) interferometer. The choice of the laser, the frequency of the pulse sequence and the selection of the pulses per revolution is done in a manner known in interferometers. An optical WORM memory is considered to be a preferable storage medium 5, although other optical memories are also suitable, for example in the form of compact discs or magnetic memories in the form of floppy discs or floptical discs, as well as fixed discs. Fundamentally, any memory of which the content is read out by a relative movement between the storage medium 5 and the read head 6 can be employed. This is done in technically known manner, which means that all angle encoders or rotation angle pickups known today are suitable if the stored angle code or the clock frequency corresponds to the frequency generated from the laser signal.

During operation, the stored pulse sequence is read out by the read head 6 on rotation of the retroreflector 32, the storage medium 5 and the rotor of the motor 4; said pulse sequence is processed in known manner in the signal electronics 7 following the read head 6 just like the otherwise usual pulse sequence of the laser. The clock frequency read out can be employed both for triggering an analog-digital converter, not shown in detail, and for controlling the motor 4. Furthermore, a high-frequency clock pulse can be derived from the laser signal and recorded because such a high-frequency clock pulse is more suitable for motor control; by stepping down a lower-frequency clock pulse required for an analog-digital conversion can be obtained from the high-frequency clock pulse.

In interferometers in which path differences are generated by rotating mirrors, in particular by retroreflectors, it should be remembered that the frequency of the laser interferograms is not necessarily constant. On the contrary, a retroreflector rotating with constant angular velocity generates for example a laser interferogram which is frequeney-modulated in sinusoidal i.e. non-linear manner. This leads to a fixed phase relationship between the optical path difference and the frequency of the laser interferogram. It is therefore obvious to construct the interferometer in such a manner that satisfactory and reliable adjustment and fixing of the individual components is ensured and thus the proper association of clock pulse and a path measurement derived therefrom guaranteed. This means that during the generation of the clock track on the storage medium the mechanical setting of the individual components must be the same as during the measuring operation. For this purpose, in known manner locating pins or similar centering means may be employed, these ensuring a rigid reproduceable connection between the retroreflector 32, the storage medium 5 and the retroreflector pivot shaft 32D; furthermore, this also ensures the setting of the read head 6 with respect to the angular position of the rotation or pivot shaft 32D.

Figure 2:
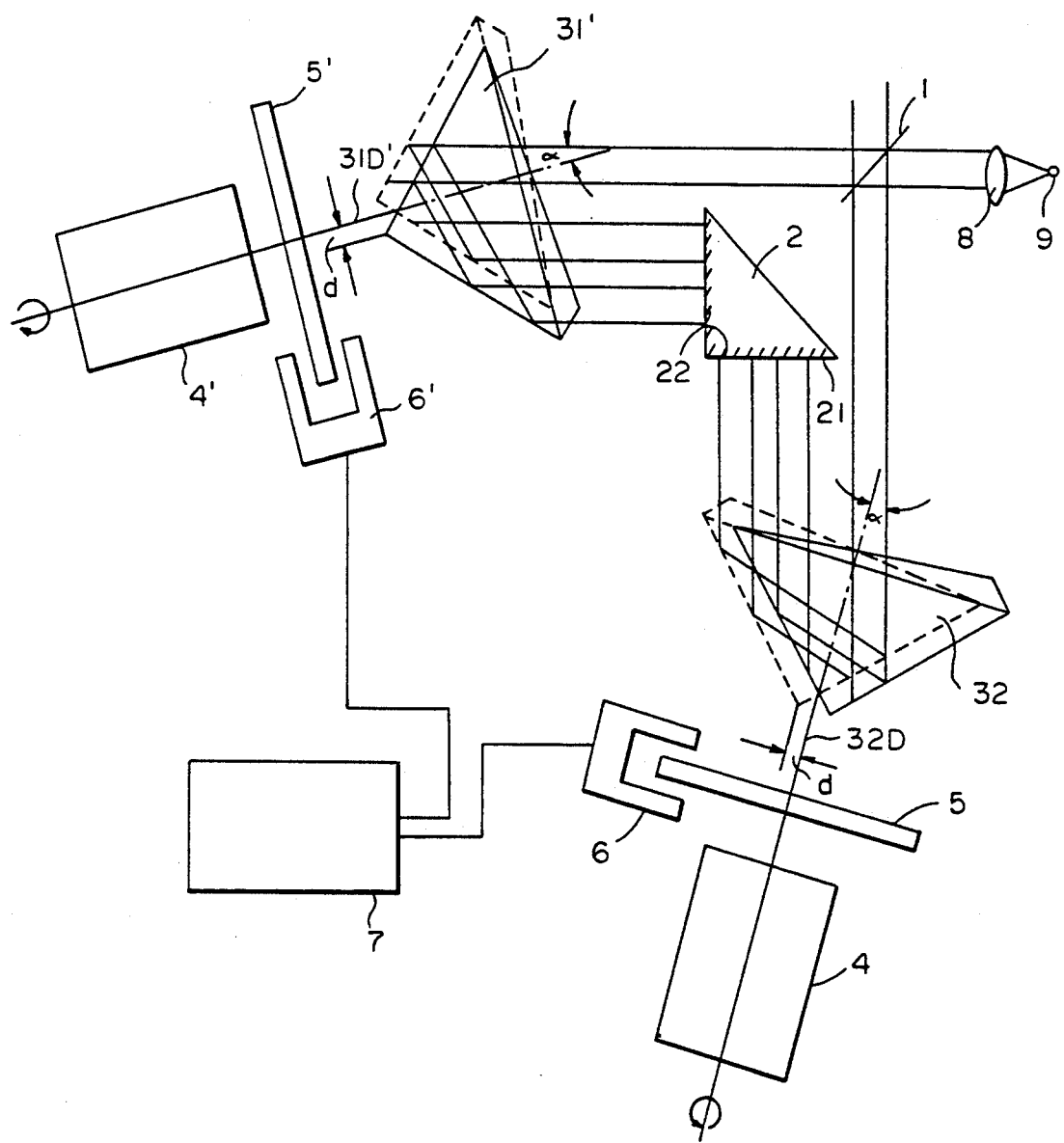
FIG. 2 shows an embodiment of an interferometer equipped according to the invention and having two rotating retroreflectors.

Instead of a stationarily disposed retroreflector 31, an interferometer illustrated in FIG. 2 comprises a further rotatable retroreflector 31', the pivot axis 21D' of which is coupled rigidly to a further motor 4'. Furthermore, a further storage medium 5' corresponding in makeup and configuration to the storage medium 5 already described in detail in connection with FIG. 1 is connected to the pivot axis 31D'. In the embodiment of the interferometer according to FIG. 1 a read head 6' is also stationarily associated with the storage medium 5' connected to the rotation shaft 31D' and the output of said head is likewise connected to the signal electronics 7.

During operation the two retroreflectors 31' and 32 run oppositely-phased but synchronously with respect to the path difference, i.e. while the path length is reduced by the one retroreflector, it is increased by the other. Thus, a path length measurement occurs as already described with the aid of FIG. 1 with the storage element 5, to which in the manner described a clock sequence is introduced as well as with the aid of the read head 6 associated with the storage medium 5 and the control electronics 7 associated with the read head. The synchronization of the two motors 4 and 4' is preferably ensured in that the motors 4 and 4' are stepping motors with high step number which are controlled by the same clock pulse generated for example by a computer. However, synchronization of the motors 4 and 4' is for example also possible via high-resolution angle pickups. Furthermore, the synchronization can also be effected via the control electronics 7 by imparting to the storage medium 5' rigidly connected to the rotation shaft of the motor 4' a clock sequence which corresponds to the clock sequence on the storage medium 5 and which is read by means of the read head 6' fixedly associated with the storage medium 5' and is supplied to the control electronics 7 following said read head 6'. It is however also possible to provide only one motor 4 and via corresponding transmissions, in known manner by mechanical or electromechanical methods, the drive of the two retroreflectors 31' and 32 is effected so that the rotary movements of said two reflectors 31' and 32 are synchronous. A corresponding procedure can be adopted in interferometers having more than two rotating retroreflectors.

In a correspondingly modified manner, a path measurement can also be carried out in all interferometers in which the path difference is generated via a rotary movement, i.e. for example also in double pendulum interferometers. The clock track on the storage medium is to be adapted to the rotary movement; this is for example automatically the case when a laser is used for generating the clock track.

A particular advantage with this type of path measurement resides in that further data can also be stored on the storage medium, for example the marking of a zero or start position or other data which can be used for controlling the interferometer. Also, both sides of the medium may be used, for example also to increase the storage density by writing the tracks on both sides staggered half a step width.

Furthermore, a plurality of different clock sequences can be stored on different tracks. This is particularly advantageous and useful when the interferometers permit the setting of different spectral resolutions, this in turn resulting in different path differences and thus interferograms with a different number of measuring points. For each setting a corresponding clock sequence can be stored on different tracks of the storage medium. Furthermore, in known manner a plurality of fixedly associated read heads can be employed or alternatively one read head radially adjustable with respect to the particular rotation axis.

As is known, in interferometers with rotating retroreflectors the spectral resolution can be changed by the inclination of the rotation axis with respect to the optical axis. A fixed read head can then be provided which on inclination of the rotation axis is automatically positioned above different tracks of the storage medium because the latter is also displaced due to the inclination of the rotation axis.

In a preferred embodiment of the invention only a single clock sequence is stored for all possible spectral resolutions. Such a clock sequence is obtained by setting the interferometer to the highest resolution, i.e. the greatest path difference, for the recording. In this setting, the number of pulses per revolution from the interferogram is the maximum number of pulses so that only one clock sequence with maximum write density is recorded. In measuring mode, this clock sequence is then suitable for maximum resolution without any modification. For measurements with a lower resolution, for example a mechanically set one, this clock sequence is read out and in the following signal electronics 7 is stepped down in known manner corresponding to the spectral resolution set, i.e. converted to a clock sequence with lower frequency.

Furthermore, the apparatus can be left mechanically set always to the maximum spectral resolution. Measurements with a lower resolution are then carried out in that data are recorded only over a corresponding fraction of the rotary movement. In this case the clock sequence provided on the storage medium is identical for all measurements and is used for controlling the desired resolution by means of a counting.

A further advantage of the invention resides in that due to the high storage density of modern storage media the geometrical dimensions may be kept very small. A numerical example given below will illustrate this. A floptical disc, positioned via a laser diode and representing a magnetic data memory, has today for example a write density of 24175 bits per inch or 950 bits/mm. With a spectral resolution of about 1 cm$^{-1}$ for a wavelength of 2 $\mu$m, 8192 data points are recorded. The clock sequence necessary for this purpose would thus have to furnish 8192 pulses; these can be recorded on a track length of 8.7 mm. Now, if the measuring travel covers a rotation angle of 120° a total track length of about 26 mm results. In this case the radius of the circular disc-like storage element would only have to be 4.2 mm. Of course, in this case as well the measured value of equal path lengths, i.e. the ZPD (Zero Phase Difference) value, is determined from the digitized interferogram.

The invention claimed is:

1. Method for measuring and determining a rotation angle of a rotating object comprising the steps of:

applying a clock track corresponding to a desired angular resolution on a circular disc storage medium, rotating the storage medium synchronously with the rotating object, supplying a pulse sequence corresponding to the clock track when in operation for further processing to following signal electronics in which an actual rotation angle or an actual angular velocity of the rotating object is available for a relative angle measurement, storing the pulse sequence on the circular disc storage medium, wherein the track has a maximum write density and is at the extreme outer periphery of the circular disc storage medium to obtain an optimum angular resolution, using additional tracks arranged inwardly of the clock track for lower angular resolutions and temporarily providing an interferometer to generate a clock sequence on the circular disc storage medium and recording a reference path measuring system and a pulse sequence corresponding to the measured path difference by a reference measurement on the clock track of the circular disc storage medium and, determining the rotation angle of said object based on the reference measurement and the relative angle measurement.

2. Method according to claim 1, further comprising: providing an absolute angle measurement by storing one or more pulse sequences coded on the circular disc storage medium in one or more tracks.

3. Method according to claim 1, further comprising: generating a path difference in Michelson interferometers by one or more rotating mirror elements and measuring rotation angles with the aid of storage media rigidly connected to the rotating mirror elements and read heads fixedly associated with said media, and determining the path difference in the interferometer from the measured rotation angles in associated electronics.

4. Method according to claim 1, wherein said circular disc storage medium is a magnetic or optomagnetic storage medium.

5. Method according to claim 1, wherein said circular disc storage medium is an optical storage medium.

6. Apparatus for measuring and determining a rotation angle of a rotating object, comprising a circular disc storage medium on which a clock track is applied, a read head for reading the clock track applied and signal electronics, wherein the storage medium has a form of a circular disc on which concentric circles of the clock track are applied, said circular disc being rigidly and coaxially coupled to a shaft of the rotating object in such a manner that a pulse sequence corresponding to the clock track and a desired angular resolution is processed in the signal electronics following the read head so that the actual rotation angle or the actual angular velocity of the rotating object is available, wherein a replaceable storage medium is installed in a recording interferometer and in an operating interferometer in a defined location with respect to the angular position thereof by means of locating and centering means, and that the storage medium is fixedly accommodated in the operating interferometer.

7. Apparatus according to claim 6, wherein said storage medium is a magnetic or opto-magnetic storage medium.

8. Apparatus according to claim 6, wherein said storage medium is an optical storage medium.

9. Apparatus according to claim 6, wherein the storage medium is a magnetic disc memory in the form of a floppy disc or a floptical disc, an optical memory in the form of a compact disc or an optomagnetic memory or a Write Once Read Multiple memory.

* * * * *